United States Patent
Thomsen

(10) Patent No.: US 11,467,926 B2
(45) Date of Patent: Oct. 11, 2022

(54) ENHANCED DATABASE RECOVERY BY MAINTAINING ORIGINAL PAGE SAVEPOINT VERSIONS

(71) Applicant: SAP SE, Walldorf (DE)

(72) Inventor: Dirk Thomsen, Berlin (DE)

(73) Assignee: SAP SE, Walldorf (DE)

(*) Notice: Subject to any disclaimer, the term of this patent is extended or adjusted under 35 U.S.C. 154(b) by 135 days.

(21) Appl. No.: 16/824,494

(22) Filed: Mar. 19, 2020

(65) Prior Publication Data

US 2021/0294703 A1 Sep. 23, 2021

(51) Int. Cl.
*G06F 11/14* (2006.01)
*G06F 11/10* (2006.01)
*G06F 12/0804* (2016.01)

(52) U.S. Cl.
CPC ...... *G06F 11/1469* (2013.01); *G06F 11/1004* (2013.01); *G06F 12/0804* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,712,970 | B1* | 4/2014 | Sim-Tang | G06F 16/20 707/672 |
| 2005/0223043 | A1* | 10/2005 | Randal | G06F 16/221 |
| 2012/0266019 | A1* | 10/2012 | Sim-Tang | G06F 11/1471 714/21 |
| 2012/0324280 | A1* | 12/2012 | Wang | G06F 11/1417 714/15 |
| 2018/0260425 | A1* | 9/2018 | Thomsen | G06F 16/2358 |
| 2018/0276083 | A1* | 9/2018 | Mitkar | G06F 11/3006 |

* cited by examiner

*Primary Examiner* — Eddy Cheung
(74) *Attorney, Agent, or Firm* — Klarquist Sparkman, LLP

(57) ABSTRACT

A database receives pages that are piped from backup media with each of the pages having a corresponding savepoint version. At least a portion of the pages are then flagged as being from recovery. The savepoint versions for the pages are maintained if they have a flag. A single checksum is then calculated for each page to confirm integrity. Each page is then loaded into memory of the database after it is confirming the corresponding calculated single checksum. Related apparatus, systems, techniques and articles are also described.

20 Claims, 4 Drawing Sheets

ENHANCED DATABASE RECOVERY BY MAINTAINING ORIGINAL PAGE SAVEPOINT VERSIONS

TECHNICAL FIELD

The subject matter described herein relates to enhanced techniques for database recovery and database replication in which original savepoint information is maintained.

BACKGROUND

Databases utilize savepoints to indicate a point within a transaction that can be rolled back to without affecting any work done in the transaction before the savepoint was created. Multiple savepoints can exist within a single transaction. Savepoints are useful for implementing complex error recovery in database applications. If an error occurs in the midst of a multiple-statement transaction, the application may be able to recover from the error (by rolling back to a savepoint) without needing to abort the entire transaction.

SUMMARY

In one aspect, a database receives pages that are piped from backup media with each of the pages having a corresponding savepoint version. At least a portion of the pages are then flagged as being from recovery. The savepoint versions for the pages are maintained if they have a flag. A single checksum is then calculated for each page to confirm integrity. Each page is then loaded into memory of the database after it is confirming the corresponding calculated single checksum.

A current savepoint version can be assigned to each page not flagged as being from recovery.

The pages can be flushed from memory to physical persistence. In such cases, the flags for the pages can be reset as they are flushed to physical persistence. The flags, in some variations, can be stored in a transient control block which can be reset or otherwise deleted when the pages are flushed.

Coordination can be made with the backup media to initiate the piping of the pages.

The database can be an in-memory database in which data is loaded into main memory and flushed to physical persistence.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for database recovery and replication in which savepoint version information for pages is maintained rather than being updated. Maintaining the original savepoint version on a page can, for example, allow for enhanced forensic information so that it can be determined when such page was modified. In addition, fewer computing resources are needed to confirm the integrity of pages being recovered which, in turn, also allows for more rapid database recovery.

Figure 1:
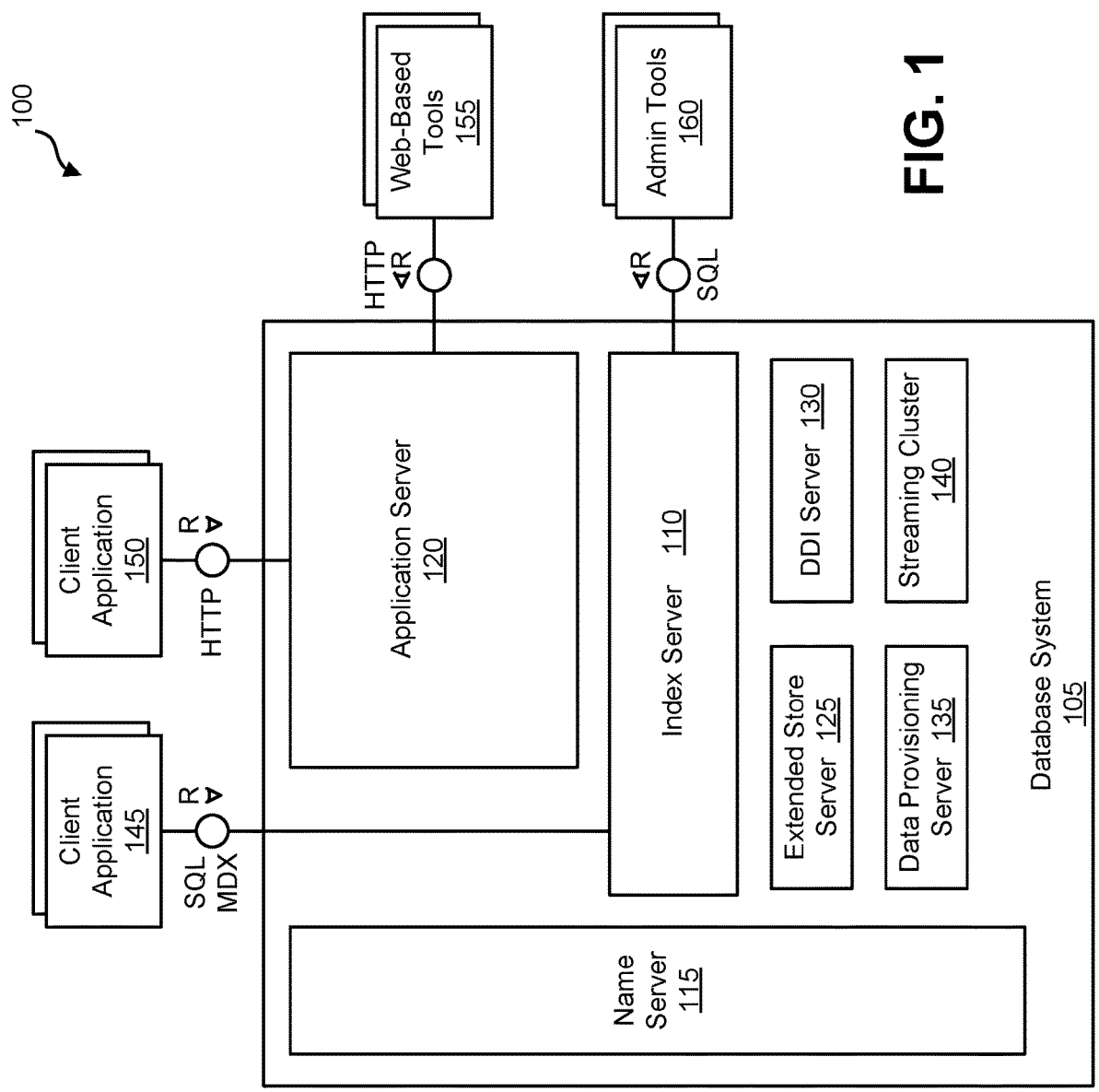
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input/output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
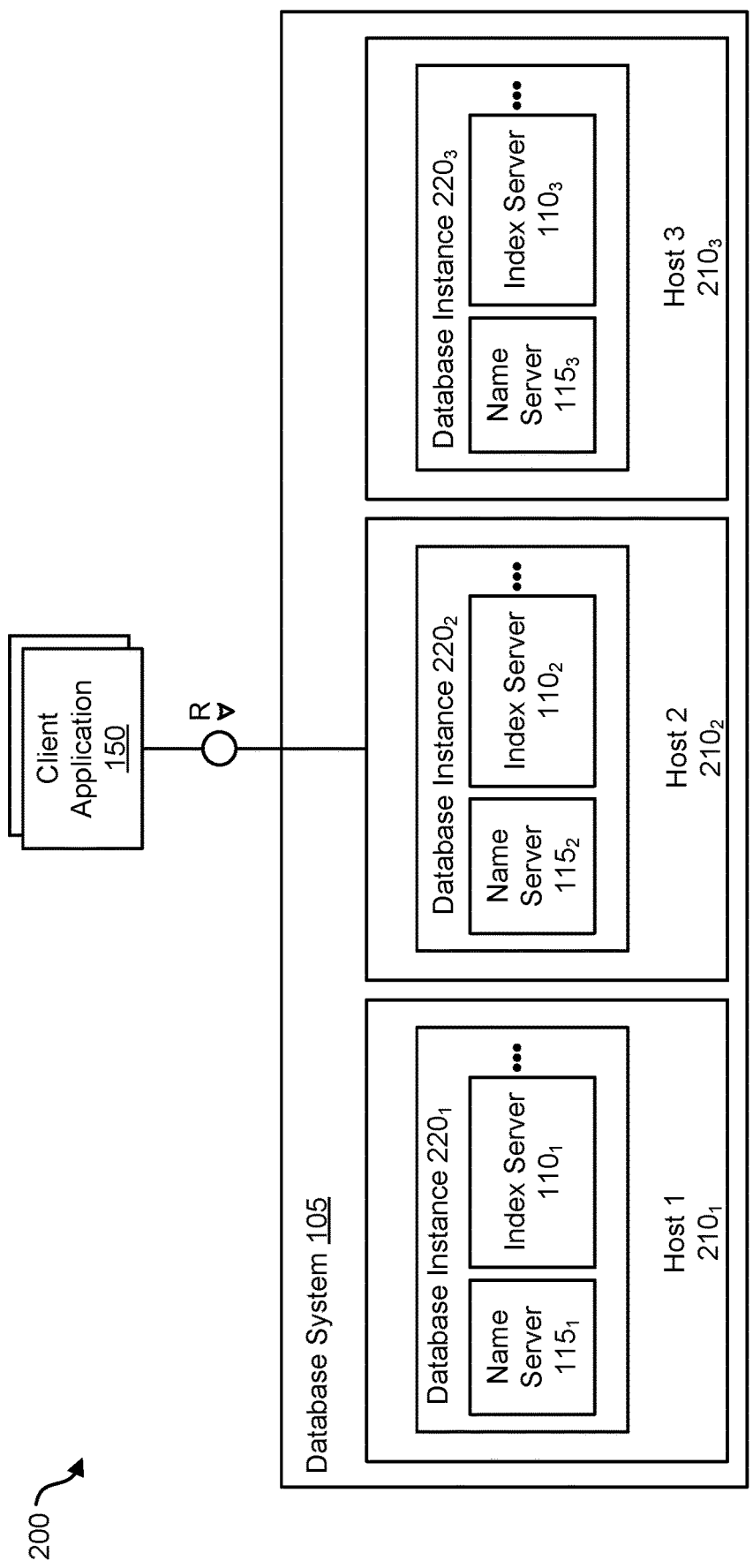
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
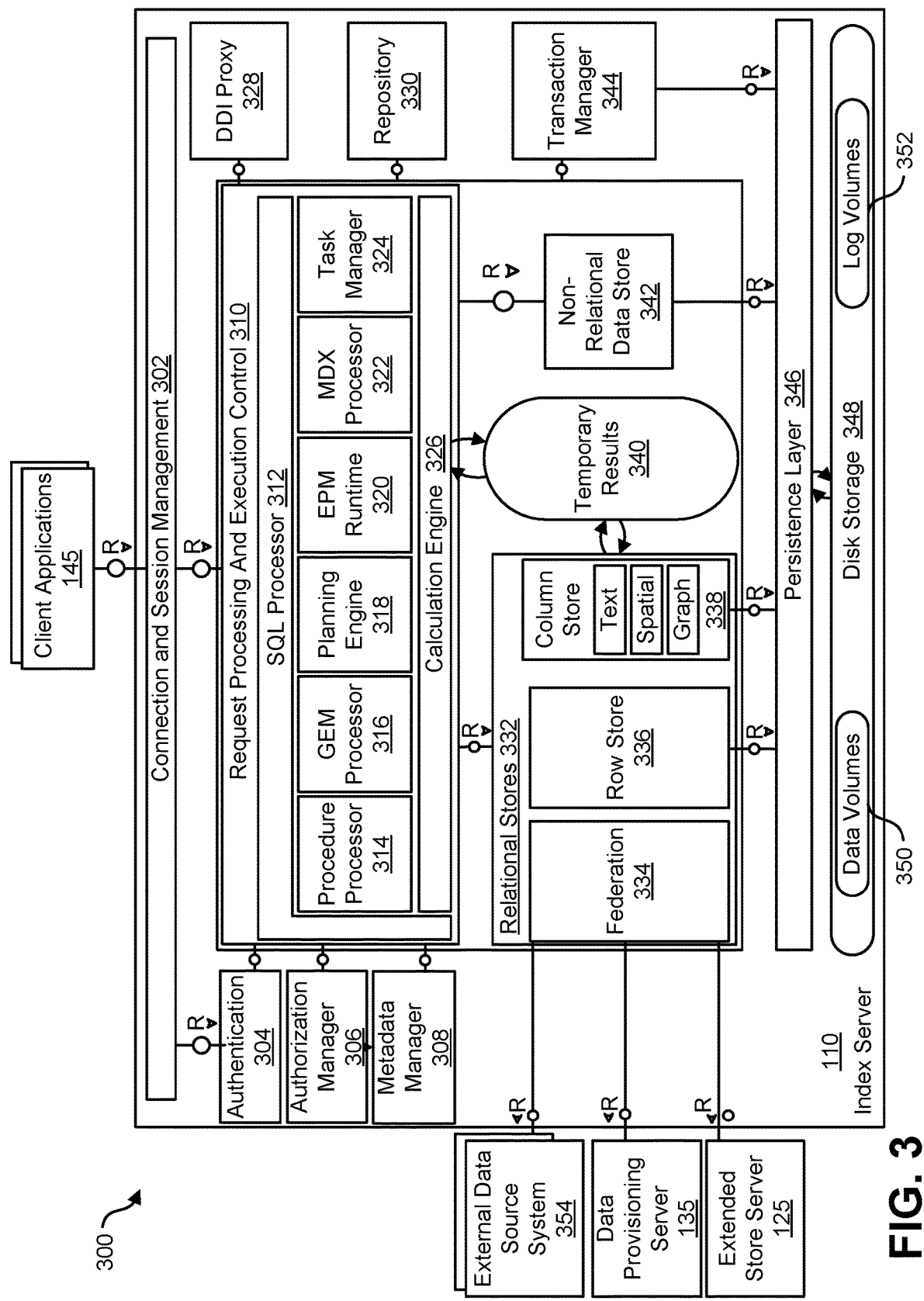
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph application program interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a recovery log. Recovery log entries can be written in the persistence layer 348 (e.g., in recovery log volumes 352) explicitly by using a log interface or implicitly when using the virtual file abstraction. The recovery log volumes 352 can include redo logs which specify database operations to be replayed whereas data volume 350 can contain undo logs which specify database operations to be undone as well as cleanup logs of committed operations which can be executed by a garbage collection process to reorganize the data area (e.g., free up space occupied by deleted data, etc.).

The persistence layer 346 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Database snapshots operate at the data-page level such that all pages being modified are copied from the source data volume to the snapshot prior to their being modified via a copy-on-write operation. The snapshot can store such original pages thereby preserving the data records as they existed when the snapshot was created.

System savepoints (also known in the field of relational database servers as checkpoints) can be periodically or manually generated and provide a point at which the recovery log can be truncated. The system savepoints can be stored, for example, within log volumes 252.

The savepoint can, in some variations, include an undo log of transactions which were open in the savepoint and/or a cleanup log of transactions which were committed in the savepoint but not yet garbage collected (i.e., data which has been deleted by these transactions has been marked as deleted but has not been deleted in a physical manner to assure multiversion concurrency control).

The recovery log can comprise a log of all changes to the database contents (i.e., the database system 105, etc.) since the last system savepoint, such that when a database server is restarted, its latest state is restored by replaying the changes from the recovery log on top of the last system savepoint. Typically, in a relational database system, the previous recovery log is cleared whenever a system savepoint occurs, which then starts a new, empty recovery log that will be effective until the next system savepoint. While the recovery log is processed, a new cleanup log is generated which needs to be processed as soon as the commit is replayed to avoid a growing data area because of deleted but not garbage collected data.

The database 105 can, for example, write savepoints at pre-defined intervals (e.g., every five minutes, etc.). During a savepoint operation, the database 105 flushes all changed data from memory to the data volumes 350. The data belonging to a savepoint represents a consistent state of the data on disk and remains so until the next savepoint operation has completed. Redo log entries are written to the log volumes for all changes to persistent data. In the event of a database restart (for example, after a crash), the data from the last completed savepoint can be read from the data volumes 350, and the redo log entries written to the log volumes since the last savepoint can be replayed.

Savepoints can also be triggered automatically by a number of other operations such as data backup, and database shutdown and restart. Savepoints can also be manually triggered.

Each page being saved as part of a savepoint has a corresponding version number. Such version number, can for example, be ascending and is used to specify an age of the page. The savepoint version can be stored in the header of a page and, optionally, in a converter entry (i.e., a transient data structure used to map pages in—memory to the data volumes 350). With conventional arrangements, when loading a page from disk (i.e., the data volumes 350) into memory, the savepoint version can be checked to confirm the correct version (thus the correct version of the page). Other integrity checks such as a checksum can be conducted on the page.

If database 105 is running for several weeks, months. Pages might have different savepoint versions (based on when it was last written to disk (i.e., the data volumes 350)). For a backup, all pages from the data volumes 350 can be piped in a stream to a backup manager of the database 105 so they can be stored on backup media (e.g., slow access tape drives, etc.). Pages in the stream are checked to verify that they have a correct savepoint version (i.e., the expected savepoint version) and the checksum to confirm that the data in the page is intact. With conventional arrangements, when recovery manager writes the piped pages into the backup media (i.e., the pages are flushed from memory to the backup media), the headers of such pages are modified to include a current savepoint version as opposed to the corresponding original savepoint version. For example, all pages being stored in the backup media would be assigned savepoint version 100 as opposed to the original savepoint versions.

Using a current savepoint version instead of the original savepoint has two significant impacts. First, after a restart from a backup (as part of a database recovery process), all pages have the same savepoint version which prevents the age of the page (e.g., one year, three years, etc.) from being identified which is needed in some support scenarios.

Second, during database recovery, there is a need to calculate a checksum for each page. However, when the savepoint version is updated (as opposed to maintaining the original savepoint version), the savepoint version value in the header of the page is updated and, in turn, which makes the checksum in the page incorrect. In particular, during recovery, all pages are checked that are streamed in via the pipe. Such a check can include a checksum verification (which is a checksum calculation and comparison with the stored checksum in the page). If the page is modified by changing the savepoint version, the checksum needs to be calculated again while writing the page. If the original savepoint version is maintained, there is no page modification which obviates the need for the second checksum calculation. In addition, by avoiding a page modification, there is no need to access the page for write operations, just for read operations. If page protection keys or similar mechanisms are used to provide page protection, opening the page for write operations can be avoided (e.g. removing the write protection). For large data volumes (e.g., multiple terabytes, etc.), the double checksum calculation can be processor intensive which, in turn, can also extend an amount of time for the database recovery process. Such delays are particularly problematic for database replication scenarios in which there is a desired to have a secondary database up and running as soon as possible after a database interruption event.

With the current subject matter, when pages are being obtained from the backup media, they can be flagged as being "from recovery". Such flagging can, for example, be a Boolean flag in a page control block (i.e., transient information kept in memory for each page during a page flushing process). The recovery manager when detecting such flags, can bypass the updating of the savepoint version of the page. By maintaining the original savepoint version, only a single checksum calculation needs to be performed when such pages are loaded into the memory of the database 105.

Further, when the database 105 flushes the pages "from recover" into the data volumes 350, the flag can be reset (i.e., set to zero) so that the page can be treated normally (e.g., checksum can be calculated using the savepoint version in the header, etc.).

Figure 4:
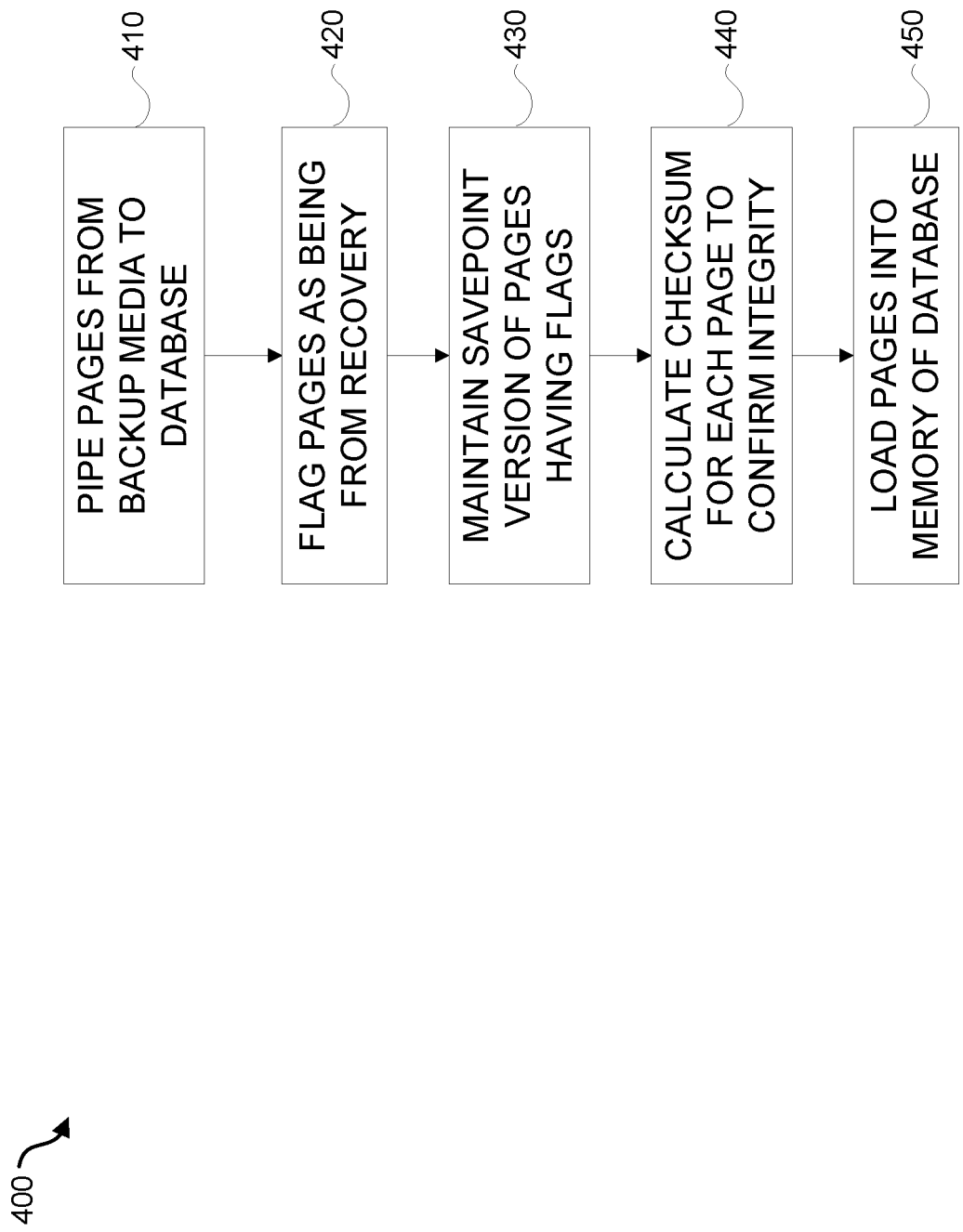
FIG. 4 is a process flow diagram for enhanced database recovery and replication in which savepoint information is maintained.

FIG. 4 is a process flow diagram 400 for database recovery in which, at 410, pages are piped (i.e., in a data stream to a recovery manager of a database) to a database that each have a corresponding savepoint version. Thereafter, at 420, at least a portion of the pages are flagged as being from recovery. For such pages, at 430, the corresponding savepoint version of each page is maintained rather than being updated with a current savepoint version. A single checksum is then calculated, at 440, for each page to confirm integrity. Each page is then, at 450, loaded into memory of the database after confirming the corresponding calculated single checksum.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as would a non-transient solid-state memory or a magnetic hard drive or any equivalent storage medium. The computer-readable medium can alternatively or additionally store such machine instructions in a transient manner, such as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for database recovery comprising:
   receiving, by a database, pages being piped from backup media, each of the respective pages having a corresponding savepoint version indicating an age of the page, wherein some of the savepoint versions of the respective pages are different; and
   for the respective pages:
      automatically setting a flag, in a transient page control block, on the page indicating that the page is from recovery;
      upon determining that the flag on the page is set indicating that the page is from recovery, bypassing an update of the corresponding savepoint version of the page and maintaining the corresponding savepoint version of the page, wherein an age of the page can be determined from the maintained corresponding savepoint version;
      calculating a single checksum for each page to confirm integrity; and
      loading each page into memory of the database after confirming the corresponding calculated single checksum.

2. The method of claim 1, wherein the flag is a Boolean flag.

3. The method of claim 1 further comprising:
   for additional pages for which a flag indicating the pages are from recovery is not set, assigning a current savepoint version to each of the additional pages, wherein ages for the pages cannot be determined from the current savepoint version.

4. The method of claim 1 further comprising:
flushing the pages from memory to physical persistence; and
resetting the flags for the pages as they are flushed to physical persistence.

5. The method of claim 1, wherein
the transient page control block is reset as the pages are flushed to the physical persistence.

6. The method of claim 1 further comprising:
causing the pages to be piped from the backup media.

7. The method of claim 1, wherein the database is an in-memory database in which data is loaded into main memory and flushed to physical persistence.

8. A system for database recovery comprising:
at least one data processor; and
memory including instructions which, when executed by the at least one data processor, result in operations comprising:
receiving, by a database, pages being piped from backup media, each of the respective pages having a corresponding savepoint version, wherein some of the savepoint versions of the respective pages are different; and
for the respective pages:
automatically setting a flag, in a transient page control block, on the page indicating that the page is from recovery;
upon determining that the flag on the page is set indicating that the page is from recovery, bypassing an update of the corresponding savepoint version of the page and maintaining the corresponding savepoint version of the page, wherein an age of the page can be determined from the maintained corresponding savepoint version;
calculating a single checksum for each page to confirm integrity; and
loading each page into memory of the database after confirming the corresponding calculated single checksum.

9. The system of claim 8, wherein the flag is a Boolean flag.

10. The system of claim 8, wherein the operations further comprise:
for additional pages for which a flag indicating the pages are from recovery is not set, assigning a current savepoint version to each of the additional pages in place of the respective corresponding savepoint versions, wherein ages for the pages cannot be determined from the current savepoint version.

11. The system of claim 8, wherein the operations further comprise:
flushing the pages from memory to physical persistence; and
resetting the flags for the pages as they are flushed to physical persistence.

12. The system of claim 8, wherein:
the transient page control block is reset as the pages are flushed to the physical persistence.

13. The system of claim 8, wherein the operations further comprise:
causing the pages to be piped from the backup media.

14. The system of claim 8 further comprising the database, wherein the database is an in-memory database in which data is loaded into main memory and flushed to physical persistence.

15. A non-transitory computer program product storing instructions which, when executed by at least one computing device, result in operations comprising:
receiving, by a database, pages being piped from backup media, each of the respective pages having a corresponding savepoint version, wherein some of the savepoint versions of the respective pages are different; and
for the respective pages:
automatically setting a flag, in a transient page control block, on the page indicating that the page is from recovery;
upon determining that the flag on the page is set indicating that the page is from recovery, bypassing an update of the corresponding savepoint version of the page and maintaining the corresponding savepoint version of the page, wherein an age of the page can be determined from the maintained corresponding savepoint version;
calculating a single checksum for each page to confirm integrity; and
loading each page into memory of the database after confirming the corresponding calculated single checksum.

16. The computer program of claim 15, wherein the flag is a Boolean flag.

17. The computer program product of claim 15, wherein the operations further comprise:
for additional pages for which a flag indicating the pages are from recovery is not set, assigning a current savepoint version to each of the additional pages, wherein ages for the pages cannot be determined from the current savepoint version.

18. The computer program product of claim 15, wherein the operations further comprise:
flushing the pages from memory to physical persistence; and
resetting the flags for the pages as they are flushed to physical persistence.

19. The computer program product of claim 15, wherein:
the transient page control block is reset as the pages are flushed to the physical persistence.

20. The computer program product of claim 15, wherein the database is an in-memory database in which data is loaded into main memory and flushed to physical persistence.

* * * * *